United States Patent
Tanaka et al.

(10) Patent No.: US 10,415,690 B2
(45) Date of Patent: Sep. 17, 2019

(54) TOROIDAL-TYPE STEPLESS TRANSMISSION

(71) Applicant: KAWASAKI JUKOGYO KABUSHIKI KAISHA, Kobe-shi, Hyogo (JP)

(72) Inventors: Kenichiro Tanaka, Kobe (JP); Hideyuki Imai, Akashi (JP); Tatsuhiko Goi, Kobe (JP); Hidenori Arisawa, Kakogawa (JP); Masahide Kazari, Akashi (JP)

(73) Assignee: KAWASAKI JUKOGYO KABUSHIKI KAISHA, Hyogo, Kobe-shi (JP)

( * ) Notice: Subject to any disclaimer, the term of this patent is extended or adjusted under 35 U.S.C. 154(b) by 828 days.

(21) Appl. No.: 14/973,874

(22) Filed: Dec. 18, 2015

(65) Prior Publication Data

US 2016/0102750 A1 Apr. 14, 2016

Related U.S. Application Data

(63) Continuation of application No. PCT/JP2014/066387, filed on Jun. 20, 2014.

(30) Foreign Application Priority Data

Jun. 26, 2013 (JP) ................................. 2013-133476

(51) Int. Cl.
*F16H 15/38* (2006.01)
*F16H 57/04* (2010.01)

(52) U.S. Cl.
CPC ......... *F16H 57/0427* (2013.01); *F16H 15/38* (2013.01); *F16H 57/049* (2013.01)

(58) Field of Classification Search
CPC ..... F16H 15/38; F16H 57/0427; F16H 57/049
(Continued)

(56) References Cited

U.S. PATENT DOCUMENTS 6,612,962 B2 9/2003 Mori
7,211,024 B2* 5/2007 Taketsuna ............... F16H 15/38
476/40
(Continued)

FOREIGN PATENT DOCUMENTS

CN 1336992 A 2/2002
CN 1620567 A 5/2005
(Continued)

OTHER PUBLICATIONS

Communication dated Nov. 14, 2017 from the European Patent Office in counterpart European application No. 14816646.5.
(Continued)

*Primary Examiner* — William C Joyce
(74) *Attorney, Agent, or Firm* — Sughrue Mion, PLLC

(57) ABSTRACT

A toroidal-type stepless transmission includes: at least a pair of an input disc and an output disc; a power roller tiltably provided between the pair of the input disc and the output disc, the power roller being configured to transmit a driving force from the input disc to the output disc; and disc shrouds covering the input disc and the output disc, respectively. Each of the disc shrouds has an outer peripheral portion formed with an oil discharge groove configured to discharge an oil within each disc shroud to the outside, the oil discharge groove penetrating from an inner surface of the disc shroud to an outer surface of the disc shroud and extending in a circumferential direction of the disc shroud.

9 Claims, 8 Drawing Sheets

(58) Field of Classification Search
USPC .......................................... 476/8, 40, 42, 46
See application file for complete search history.

(56) References Cited

U.S. PATENT DOCUMENTS

| | | |
|---|---|---|
| 7,491,149 B2 | 2/2009 | Greenwood et al. |
| 8,727,937 B2 | 5/2014 | Tabuchi et al. |
| 2002/0137592 A1 | 9/2002 | Mori |
| 2005/0143216 A1 | 6/2005 | Greenwood et al. |
| 2010/0035720 A1 | 2/2010 | Tabuchi et al. |

FOREIGN PATENT DOCUMENTS

| | | | |
|---|---|---|---|
| CN | 101644313 A | | 2/2010 |
| EP | 1403554 A2 | | 3/2004 |
| EP | 1468210 | | 10/2004 |
| JP | 6-280960 A | | 10/1994 |
| JP | 11-280876 A | | 10/1999 |
| JP | 11-336868 | * | 12/1999 |
| JP | 2006-503230 A | | 1/2006 |
| JP | 2006-266313 A | | 10/2006 |
| JP | 2008-32084 A | | 2/2008 |
| JP | 2008-38902 A | | 2/2008 |
| JP | 2008-39088 A | | 2/2008 |
| JP | 2009-192080 A | | 8/2009 |
| WO | 03/062675 A1 | | 7/2003 |

OTHER PUBLICATIONS

International Preliminary Report on Patentability issued from the International Bureau in counterpart International Application No. PCT/JP2014/066387, dated Jan. 7, 2016.
Communication dated Mar. 17, 2017 issued by the State Intellectual Property Office of People's Republic of China in counterpart application No. 201480035912.0.
Decision of Grant for Japanese Patent Application No. 2013-133476, dated May 19, 2015.
Notification of Reason(s) for Rejection of Japanese Patent Application No. 2013-133476, dated Feb. 12, 2014.
Notification of Reason(s) for Rejection of Japanese Patent Application No. 2013-133476, dated Sep. 30, 2014.
International Search Report of PCT/JP2014/066387, dated Aug. 26, 2014. [PCT/ISA/210].

* cited by examiner

TOROIDAL-TYPE STEPLESS TRANSMISSION

CROSS REFERENCE TO THE RELATED APPLICATION

This application is a continuation application, under 35 U.S.C. § 111(a), of international application No. PCT/JP2014/066387, filed Jun. 20, 2014, which claims priority to Japanese patent application No. 2013-133476, filed Jun. 26, 2013, the disclosure of which are incorporated by reference in their entirety into this application.

BACKGROUND OF THE INVENTION

Field of the Invention

The present invention relates to a structure of a toroidal-type stepless transmission for use in, for example, an electric power generating device for an aircraft.

Description of Related Art

As an electric power generating device for an aircraft, it is known to use a constant frequency generator (IDG) which operates while keeping a rotation speed (frequency) thereof constant even when a rotation speed of an aircraft engine, which is a drive source, varies. As a transmission for keeping a rotation speed of the generator constant in the IDG, a toroidal-type stepless transmission has been proposed (e.g., see Patent Document 1). In the toroidal-type stepless transmission, it is possible to steplessly (continuously) vary a gear ratio by: bringing a power roller into contact with an input-side disc and an output-side disc, which are concentrically disposed, at high pressure; and adjusting a tilt angle of the power roller.

RELATED DOCUMENT

Patent Document

[Patent Document 1] JP Laid-open Patent Publication No. 2008-038902

SUMMARY OF THE INVENTION

However, in the case of attempting to achieving a high gear ratio with such a toroidal-type stepless transmission, as a rotation speed of each disc of the stepless transmission increases, the speed of an outer peripheral portion of the disc increases, and oil stirring resistance increases, causing a decrease in fuel consumption efficiency of an aircraft in which the stepless transmission is used. In addition, if high-speed oil is dispersed in the device, it is difficult to collect and discharge the oil and reuse the oil in the device.

Therefore, in order to solve the above-described problem, an object of the present invention is to provide a toroidal-type stepless transmission which reduces oil stirring resistance around a disc and allows oil to be easily collected and reused.

In order to achieve the above-described object, a toroidal-type stepless transmission according to the present invention includes: at least a pair of an input disc and an output disc; a power roller tiltably provided between the pair of the input disc and the output disc, the power roller being configured to transmit a driving force from the input disc to the output disc; and disc shrouds covering the input disc and the output disc, respectively. Each of the disc shrouds has an outer peripheral portion formed with an oil discharge groove configured to discharge an oil within each disc shroud to the outside, the oil discharge groove penetrating from an inner surface of the disc shroud to an outer surface of the disc shroud and extending in a circumferential direction of the disc shroud.

According to this configuration, since the input disc and the output disc are covered with the disc shrouds, it is possible to prevent excess oil present around both discs from contacting the surfaces of the discs. In addition, since the oil discharge grooves are provided in the outer peripheral portions of the disc shrouds, it is possible to use a centrifugal force to very efficiently discharge the oil within the disc shrouds to the outside while preventing the oil from entering the disc shrouds through the discharge grooves again. Therefore, oil stirring resistance around the discs is greatly reduced, and collection and reuse of the oil is made easy.

In one embodiment of the present invention, the oil discharge groove may be so formed as to discharge an oil, supplied to each of inner surfaces of the input disc and the output disc against which the power roller is pressed, to an outside of the disc shroud. According to this configuration, it is possible to more effectively use the centrifugal force of each disc to discharge the oil within each disc shroud to the outside.

In one embodiment of the present invention, an axial length of an outer peripheral wall of the disc shroud which covers an outer peripheral surface of the input disc or the output disc may be set to be shorter than an axial length of the outer peripheral surface of the input disc or the output disc, and the oil discharge groove is formed as a gap defined between the inner wall and the outer peripheral wall or as a gap defined between the outer wall and the outer peripheral wall. According to this configuration, even if a large amount of the oil flows to the surrounding of the disc, it is possible to effectively discharge the oil.

In one embodiment of the present invention, each of the disc shrouds may have an introduction port, provided in an inner wall of the disc shroud, to introduce a cooling oil from the outside of the disc shroud into the disc shroud, and the oil discharge groove may be located at least at a circumferential position downstream of the introduction port in a rotation direction of the disc. According to this configuration, it is possible to efficiently discharge cooling oil that has entered the disc shroud through the introduction port, to the outside.

In one embodiment of the present invention, the oil discharge groove may be provided in a circumferential portion corresponding to ⅛ or more of an entire circumference of the outer peripheral portion of each disc shroud. In addition, the oil discharge groove is more preferably provided over the entire circumference of the outer peripheral portion of each disc shroud. Since the discharge groove is provided at least in the circumferential portion corresponding to ⅛ or more of the entire circumference, it is possible to smoothly discharge the oil to the outside of each disc shroud to assuredly reduce the stirring resistance. In the case where the oil discharge groove is provided over the entire circumference, it is possible to discharge the oil that has reached the outer peripheral portion of each disc shroud, through a shortest path to the outside, and thus it is possible to greatly reduce the stirring resistance.

In one embodiment of the present invention, the toroidal-type stepless transmission may further include a roller shroud that covers the power roller. According to this configuration, the oil that has been used for lubricating a supporting portion for the power roller is prevented from flowing in to the disc.

In one embodiment of the present invention, the roller shroud may cover at least a portion of the power roller on a side of one of the input disc and the output disc that rotates at a higher speed. In addition, the roller shroud may cover a bearing space of the power roller. Most of the oil supplied to the power roller is discharged through the bearing space. In addition, a portion of the power roller on a side of rotation at a higher speed has higher necessity to reduce the oil stirring resistance. Therefore, according to each configuration described above, it is possible to effectively prevent the oil from flowing out, while the size and the weight of the roller shroud are reduced.

In one embodiment of the present invention, an oil discharge port may be provided in the outer peripheral portion of each disc shroud so as to open in a tangential direction of the disc. According to this configuration, it is possible to efficiently discharge and collect the oil which is supplied to each disc in order to cool each disc.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
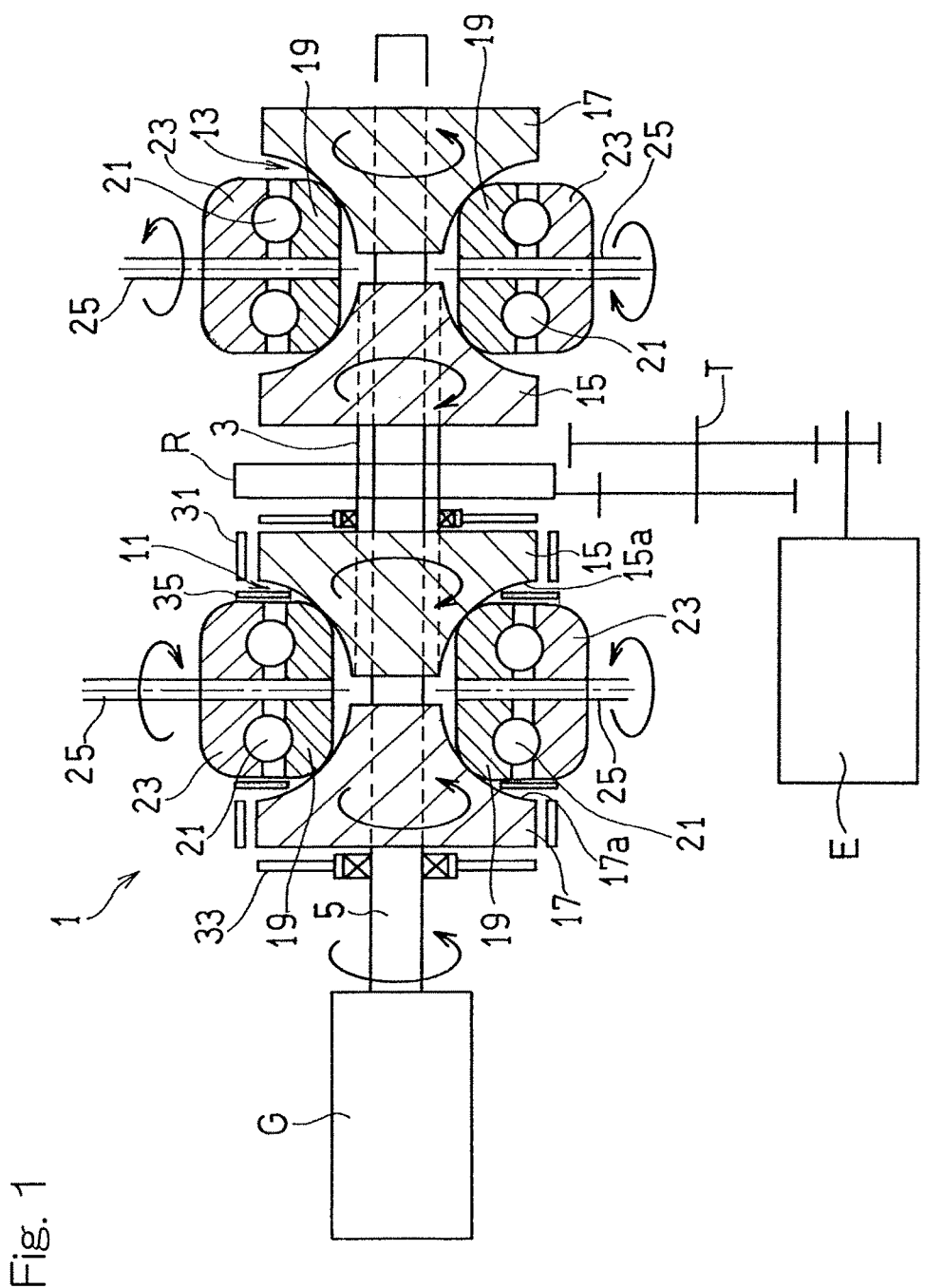
FIG. 1 is a longitudinal cross-sectional view schematically showing a schematic configuration of a toroidal-type stepless transmission according to a first embodiment of the present invention.

Hereinafter, embodiments of the present invention will be described with reference to the drawings. FIG. 1 is a longitudinal cross-sectional view schematically showing a toroidal-type stepless transmission (hereinafter, referred to simply as "stepless transmission") 1 according to a first embodiment of the present invention. The stepless transmission 1 is provided between an aircraft engine E and a constant frequency generator G which is driven by the aircraft engine E, and transmits a driving force of the aircraft engine E to the constant frequency generator G while keeping a rotation speed of the generator G constant.

The aircraft engine E is connected to a transmission input shaft 3 of the stepless transmission 1 via a power transmission mechanism T and a speed change mechanism R. Power inputted to the transmission input shaft 3 is outputted via the stepless transmission 1 from a transmission output shaft 5 which is concentrically disposed at a hollow portion of the transmission input shaft 3, to the generator G.

As shown in FIG. 1, the stepless transmission 1 is configured as a double-cavity-type toroidal traction drive transmission, in which a first cavity 11 and a second cavity 13 are provided so as to be spaced apart from each other at a predetermined interval along the transmission input shaft 3. Component parts of the speed change mechanism R such as a gear, a bearing and the like are disposed between the first cavity 11 and the second cavity 13.

Each of the first cavity 11 and the second cavity 13 includes an input disc 15 which rotates with the transmission input shaft 3, an output disc 17 which rotates with the transmission output shaft 5, and a plurality of (for example, two) power rollers 19 provided between the input disc 15 and the output disc 17. The input discs 15 are provided at an axially inner side of both cavities 11, 13, and the output discs 17 are provided at an axially outer side of both cavities 11, 13.

A pair of the input disc 15 and the output disc 17 that form the first cavity 11 are concentrically opposed to each other. Similarly, another pair of the input disc 15 and the output disc 17 that form the second cavity 13 are concentrically opposed to each other. The two input discs 15, 15 are connected to each other via the transmission input shaft 3. In the present embodiment, the first cavity 11 and the second cavity 13 have the same structure, and thus the structure of the first cavity 11 will be described below as a representative.

Each power roller 19 is supported by a thrust bearing 21 and a trunnion 23 which is a support member so that the power roller 19 is rotatable about a roller shaft 25 and tiltable in a plane containing the roller shaft 25 and the transmission input shaft 3. Each power roller 19 supported thus is pressed against a concave surface-shaped inner surface 15a of the input disc 15 and a concave surface-shaped inner surface 17a of the output disc 17 at high pressure by power of a pressing force adding mechanism (not shown) which generates a pressing force to the power roller 19.

Specifically, the pressing force adding mechanism includes a disc axial force adding section which adds an axial pressing force to the input disc 15 and the output disc 17 such that the input disc 15 and the output disc 17 come close to each other; and a roller pressing force adding portion which presses the power roller 19 against both discs 15, 17. The pressing force adding mechanism presses three rolling elements, that is, the input disc 15, the output disc 17 and the power roller 19 against each other at high pressure in the cavity 11. A driving force is transmitted between three members, that is, the input disc 15, the output disc 17, and the power roller 19 by shearing resistance of high-viscosity lubricating oil films generated at contact portions between both discs 15, 17 and the power roller 19, that is, fluid friction. An acceleration ratio and a deceleration ratio of the stepless transmission 1, that is, a gear ratio thereof is changed by controlling a tilt angle, which is an inclination of the power roller 19.

The stepless transmission 1 is provided with an input-side disc shroud 31 which covers the input disc 15 and an output-side disc shroud 33 which covers the output disc 17. In addition, each power roller 19 is covered with a roller shroud 35. The configuration of the output-side disc shroud 33 will be mainly described below as a representative, but the input-side disc shroud 31 is also configured similarly to the output-side disc shroud 33.

Figure 2:
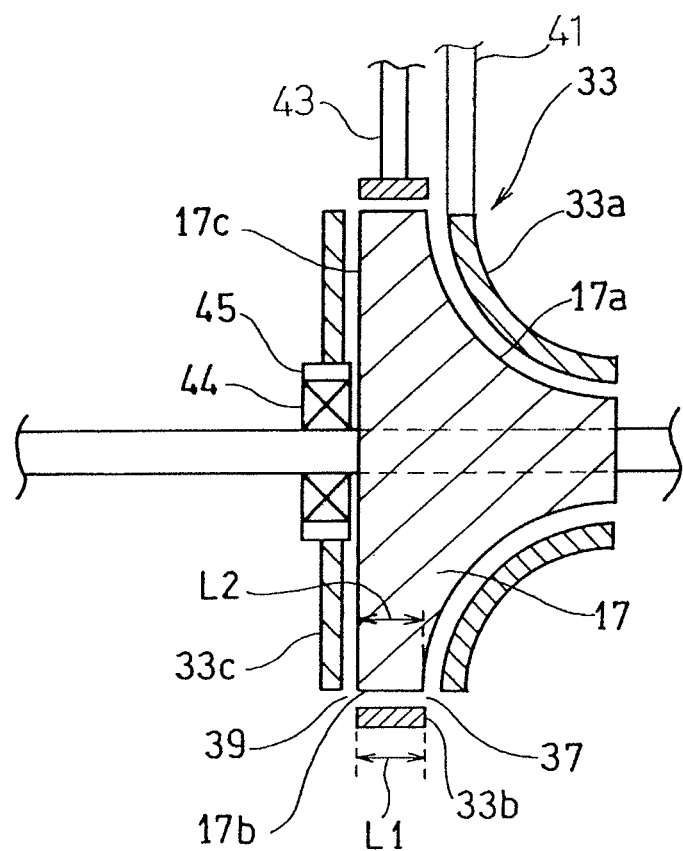
FIG. 2 is a longitudinal cross-sectional view showing a principal part of the toroidal-type stepless transmission in FIG. 1.

As shown in FIG. 2, the output disc 17 has the inner surface 17a, an outer peripheral surface 17b, and an outer surface 17c which is substantially flat and faces axially opposite direction of the inner surface 17a. The output-side disc shroud 33 includes an inner wall 33a which covers the inner surface 17a of the output disc 17 with a gap intervening therebetween, an outer peripheral wall 33b which covers the outer peripheral surface 17b with a gap intervening therebetween, and an outer wall 33c which covers the outer surface 17c with a gap intervening therebetween. The inner wall 33a of the output-side disc shroud 33 is formed in a concavely curved shape along the shape of the inner surface 17a of the output disc 17, the outer peripheral wall 33b is formed in a cylindrical shape along the shape of the outer peripheral surface 17b of the output disc 17, and the outer wall 33c is formed in a disc shape along a radial direction of the output disc 17.

The output-side disc shroud 33 has an oil discharge groove formed so as to penetrate from an inner surface of the disc shroud 33 to an outer surface of the disc shroud 33 and extend in a circumferential direction of the disc shroud 33. Specifically, in the present embodiment, a gap defined between the inner wall 33a and the outer peripheral wall 33b of the output-side disc shroud 33 forms an inner oil discharge groove 37 which penetrates from the inner surface of the disc shroud 33 to the outer surface of the disc shroud 33 and extends over the entire circumference of the output-side disc shroud 33. In addition, a gap defined between the outer wall 33c and the outer peripheral wall 33b of the output-side disc shroud 33 forms an outer oil discharge groove 39 which penetrates from the inner surface of the disc shroud to the outer surface of the disc shroud and extends over the entire circumference of the output-side disc shroud. In other words, the inner oil discharge groove 37 is provided in an outer peripheral portion of the inner wall 33a of the output-side disc shroud 33 and over the entire circumference of the outer peripheral portion, and the outer oil discharge groove 39 is provided in an outer peripheral portion of the outer wall 33c of the disc shroud and over the entire circumference of the outer peripheral portion.

The term "outer peripheral portion" of the output-side disc shroud 33 in the description in this specification refers to the outer peripheral wall 33b which covers the outer peripheral surface 17b of the output disc 17, or a portion of the inner wall 33a or the outer wall 33c which portion is adjacent to the outer peripheral wall 33b.

In the present embodiment, since the inner oil discharge groove 37 and the outer oil discharge groove 39 are provided over the entire circumference of the outer peripheral portion of the output-side disc shroud 33 as described above, the inner wall 33a, the outer peripheral wall 33b, and the outer wall 33c of the output-side disc shroud 33 are formed as separate members. The inner wall 33a is supported by a supporting column 41 which is fixed to a ceiling surface of a housing (not shown) in which the stepless transmission 1 is mounted. The outer peripheral wall 33b is supported by another supporting column 43 which is fixed to the ceiling surface of the housing (not shown) in which the stepless transmission 1 is mounted. The outer wall 33c is supported by a bearing housing 45 of a bearing 44 which supports the transmission output shaft 5. However, the supporting structures for the inner wall 33a, the outer peripheral wall 33b, and the outer wall 33c are not limited to them.

Figure 3:
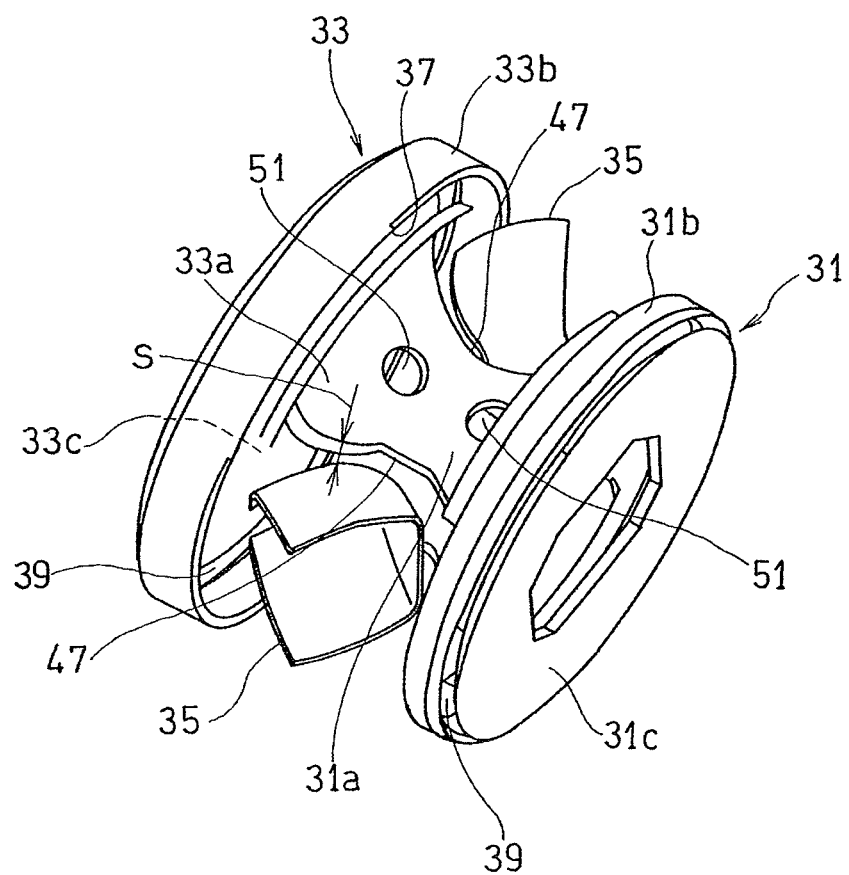
FIG. 3 is a perspective view showing disc shrouds and roller shrouds of the toroidal-type stepless transmission in FIG. 1.

As shown in FIG. 3, the inner wall 33a of the output-side disc shroud 33 has roller cuts 47 formed for avoiding interference between: the output-side disc shroud 33; and the roller shroud 35 and the power roller 19. Furthermore, the inner wall 33a of the output-side disc shroud 33 has introduction ports 51 formed for introducing cooling oil supplied from an oil spray device 60 (shown in FIG. 7B) provided outside the disc shroud, into the disc shroud 33.

Figure 7A:
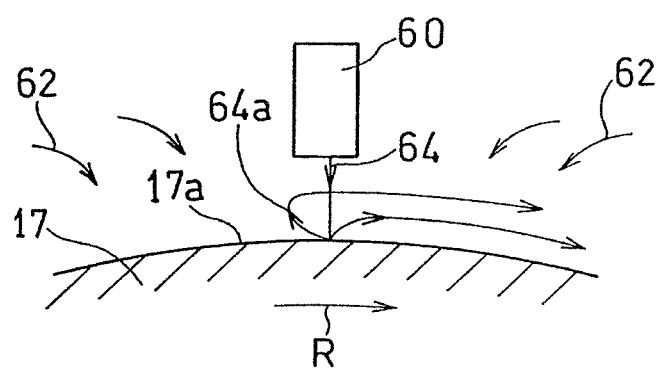
FIG. 7A is a diagram for explaining an advantageous effect of the present invention, including a partial transverse cross-sectional view showing flow of oil when a disc shroud is not provided.
Figure 7B:
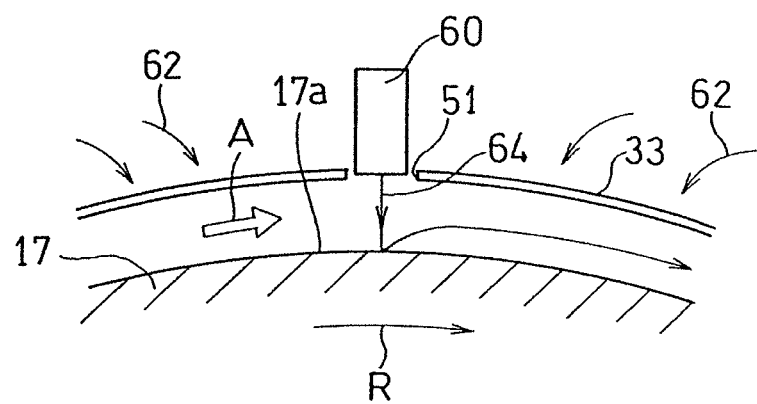
FIG. 7B is a diagram for explaining an advantageous effect of the present invention, including a partial transverse cross-sectional view showing flow of oil when a disc shroud is provided.

As shown in FIG. 7B, the oil spray device 60 supplies cooling oil 64 to the inner surface 17a of the output disc 17 within the output-side disc shroud 33 through the introduction ports 51 formed in the inner wall 33a of the output-side disc shroud 33. The arrangement of the oil spray device 60 is optional, and the oil spray device 60 may be arranged so as to spray the oil 64 toward the inner surface 17a of the output disc 17 in a direction perpendicular to the inner surface 17a. By arranging the oil spray device 60 as described above and spraying the cooling oil 64, it is possible to effectively perform impingement cooling of the output disc 17.

The roller shroud 35 is provided in order to prevent oil used for mainly lubricating and cooling the thrust bearing 21 of the power roller 19 in FIG. 1, from flowing to the surrounding of the input disc 15 or the output disc 17.

Figure 4:
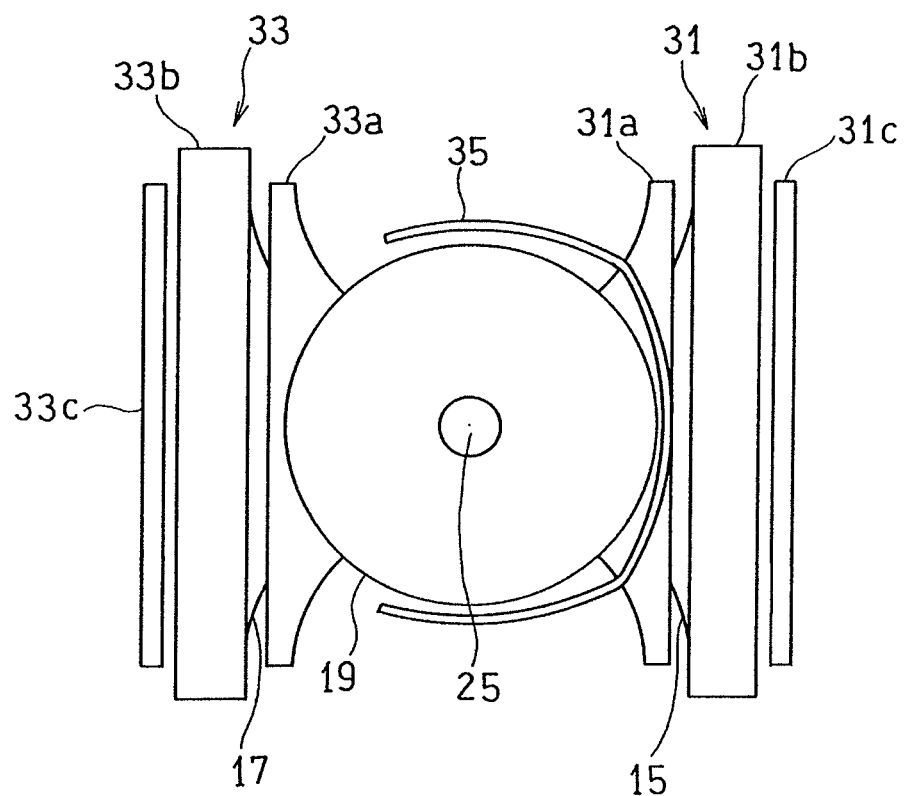
FIG. 4 is a plan view showing the toroidal-type stepless transmission in FIG. 1.

More specifically, most of the oil supplied to the power roller 19 is discharged through a bearing space of the thrust bearing 21 (a space between the power roller 19 and the trunnion 23, both of which form races of the thrust bearing 21). Therefore, in the present embodiment, the roller shroud 35 is disposed so as to cover the bearing space of the thrust bearing 21. In addition, a portion of the power roller 19 on the side of one of the input disc 15 and the output disc 17 that rotates at a higher speed, that is, on the side of the input disc 15 in the present embodiment has higher necessity to reduce oil stirring resistance. Therefore, the roller shroud 35 may cover at least a portion of the power roller 19 at the side of a disc that rotates at a higher speed. In the present embodiment, as shown in FIG. 4, the roller shroud 35 covers a portion of the power roller 19 at the input disc 15 side. In the case where the output disc 17 rotates at a higher speed than the input disc 15, the roller shroud 35 is configured to cover a portion of the power roller 19 on the output disc 17 side. With each configuration described above, it is possible to effectively prevent the oil from flowing out, while the size and the weight of the roller shroud 35 are reduced.

In the vicinity of a portion of the input disc 15 which portion is in contact with the power roller 19, the power roller 19 and the roller shroud 35 prevent the oil from entering the surrounding of the input disc 15. Therefore, in order to prevent the oil from entering the disc shroud through the gap formed between the roller shroud 35 and each roller cut 47 formed in the output-side disc shroud 33 in FIG. 3, the gap defined between the roller shroud 35 and each roller cut 47 is preferably set to be as small as possible as long as tilt of the power roller 19 is not hampered. Particularly, the gap defined between each roller cut 47 and the roller shroud 35 may be set to be small during high-speed rotation during which stirring loss of the oil caused due to the disc increases. Thus, a gap S between the outer edge of each roller cut 47 and the roller shroud 35 in the case where the power roller 19 is positioned at the highest speed side is set to be equal to or smaller than 2 mm. In the case where the power roller 19 is not covered with the roller shroud 35, a gap defined between the power roller 19 and the outer edge of each roller cut 47 is set as described above.

In the present embodiment, the inner oil discharge groove 37 and the outer oil discharge groove 39 are provided in the outer peripheral portion of the disc shroud 33, but either one of those oil discharge grooves may be omitted. In addition, in order to efficiently discharge the oil within the disc shroud 33, both oil discharge grooves 37, 39 may be provided over the entire circumference of the outer peripheral portion of the disc shroud 33 as in the present embodiment. Thus, it is possible to discharge the oil within the disc shroud that has reached the outer peripheral portion of the disc shroud 33, through a shortest path to the outside.

Figure 5:
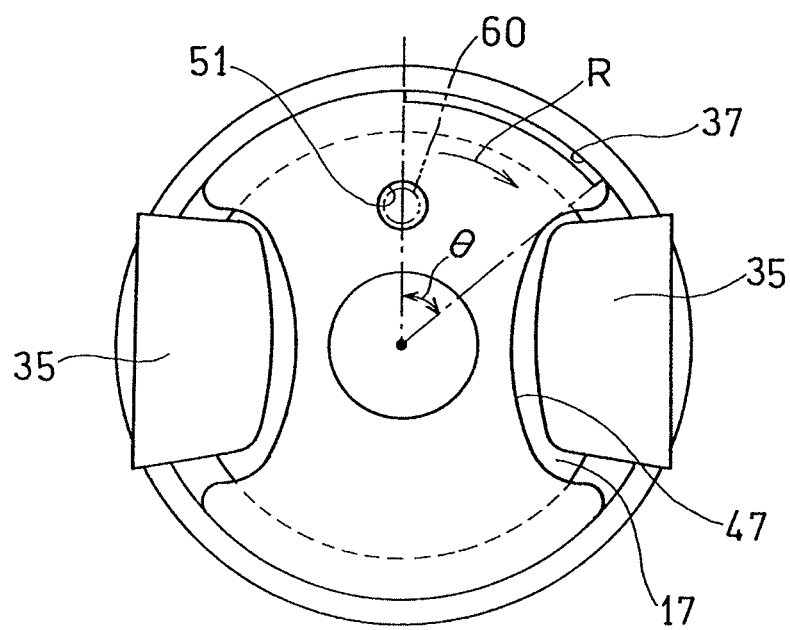
FIG. 5 is a schematic diagram showing a modification of the toroidal-type stepless transmission in FIG. 2.

However, it is possible to sufficiently reduce the oil stirring resistance when, as shown in a modification example in FIG. 5, one or both of the oil discharge grooves 37, 39 (the inner oil discharge groove 37 in the illustrated example) are provided at least in a circumferential range of equal to or greater than ⅛ of the entire circumference, that is, in a range where an opening angle θ relative to the center O of the disc is equal to or greater than 45°. In the case where the circumferential range in which the oil discharge grooves are provided is less than the entire circumference, it is possible to integrally form the inner wall 33a, the outer peripheral wall 33b and the outer wall 33c which cooperatively form the disc shroud 33, and it is possible to omit a part of the supporting mechanism for the disc shroud 33.

In addition, in the case where the circumferential range in which the oil discharge grooves 37, 39 are provided is less than the entire circumference, the oil discharge grooves 37, 39 are preferably provided at least at circumferential positions downstream of the introduction ports 51 in a rotation direction R of the disc. Since the oil discharge grooves 37, 39 are located as described above, it is possible to efficiently discharge the cooling oil sprayed from the oil spray device 60 for cooling through the introduction ports 51 into the disc shroud 33, to the outside.

Furthermore, in the example shown in FIG. 2, the outer peripheral wall 33b is configured such that an axial length L1 of the outer peripheral wall 33b of the output-side disc shroud 33 is substantially equal to an axial length L2 of the outer peripheral surface 17b of the output disc 17 and an axial position of the outer peripheral wall 33b substantially coincides with an axial position of the outer peripheral surface 17b. However, as shown in a modification example in FIG. 6, the axial length L1 of the outer peripheral wall 33b of the output-side disc shroud 33 may be set to be shorter than the axial length L2 of the outer peripheral surface 17b of the output disc 17. Because of such a configuration, an axial opening area of at least one of the inner oil discharge groove 37 and the outer oil discharge groove 39 in the example in FIG. 6 can be set to be larger than that in the example in FIG. 2.

Figure 6:
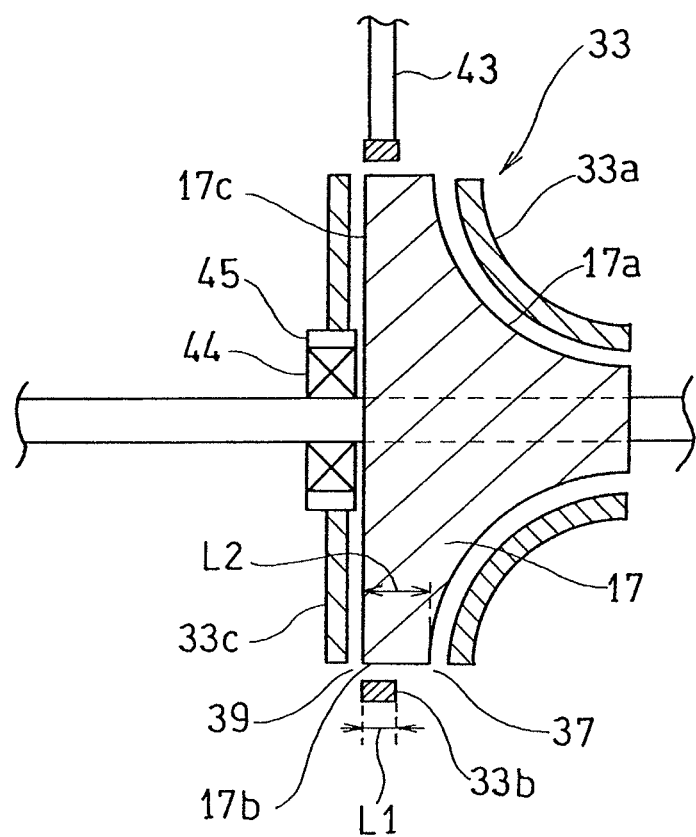
FIG. 6 is a schematic diagram showing another modification of the toroidal-type stepless transmission in FIG. 2.

Specifically, as shown in FIG. 6, a portion of the outer peripheral wall 33b of the output-side disc shroud 33 at the inner surface 17a side may be set to be axially short. In this case, the axial length L1 of the outer peripheral wall 33b is preferably in the range of ⅓ to ⅔ of the axial length L2 of the outer peripheral surface 17b of the output disc 17, and is more preferably ½ of the axial length L2 of the outer peripheral surface 17b. Because of such a configuration, the axial opening area of the inner oil discharge groove 37 can be increased. Therefore, even if a large amount of the oil flows into the inside of the inner wall 33a of the output-side disc shroud 33, it is possible to very effectively discharge the oil to the outside.

As described above, in the stepless transmission 1 according to the present embodiment, since the input disc 15 and the output disc 17 in FIG. 1 are covered with the disc shrouds 31, 33, it is possible to prevent excess oil present around both discs 15, 17 from contacting the surfaces of the discs 15, 17. In addition, since the oil discharge grooves 37, 39 are provided in the outer peripheral portions of the disc shrouds 31, 33, it is possible to use a centrifugal force to very efficiently discharge the oil within the disc shrouds to the outside while preventing the oil from entering the disc shrouds 31, 33 through the discharge grooves 37, 39 again. Therefore, the oil stirring resistance around the discs 15, 17 is greatly reduced, and collection and reuse of the oil is made easy. Particularly, in the present embodiment, the oil is supplied to the inner surfaces 15a, 17a of the respective discs 15, 17 through the respective introduction ports 51 formed in inner walls 31a, 33a of the disc shrouds 31, 33, and thus it is possible to more effectively use the centrifugal force of each disc to discharge the oil within each disc shroud to the outside.

The advantageous effects of the disc shrouds 31, 33 will be described in more detail with the output-side disc shroud 33 as a representative with reference to FIGS. 7A and 7B. In the case where the output-side disc shroud 33 is not provided, as shown in FIG. 7A, surrounding excess oil 62 contacts the inner surface 17a of the output disc 17. In addition, the oil 64 sprayed from the oil spray device 60 toward the inner surface 17a of the output disc 17 in the direction perpendicular to the inner surface 17a in order to enhance the impingement cooling effect hits and rebounds on the inner surface 17a of the output disc 17, and a part 64a thereof flows also to the upstream side in the rotation direction R of the output disc 17, thereby disturbing flow of the oil 64. This increases the stirring resistance. On the other hand, as shown in FIG. 7B, in the case where the output-side disc shroud 33 is provided, while the surrounding excess oil 62 is prevented from contacting the output disc 17, strong air flow A in the same direction as the rotation direction R is formed between the inner surface 17a of the output disc 17 and the output-side disc shroud 33. The air flow A pushes the oil 64 so as to cause the oil 64 to flow in the rotation direction R, thereby preventing the part 64a (FIG. 7A) of the oil 64 from flowing to the upstream side. This suppresses disturbance of the flow of the oil 64 to reduce the stirring resistance.

Figure 8:
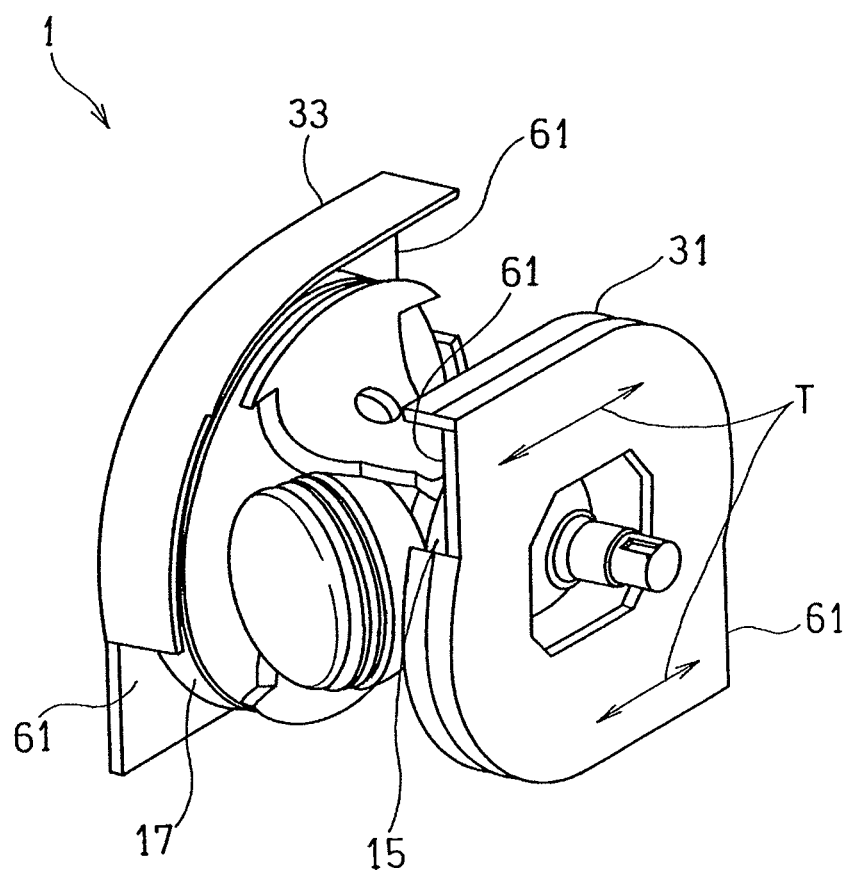
FIG. 8 is a perspective view showing a toroidal-type stepless transmission according to a second embodiment of the present invention.

Next, a second embodiment of the present invention shown in FIG. 8 will be described. In a stepless transmission 1 according to the second embodiment, in addition to the configuration of the first embodiment, oil discharge ports 61 are provided in the outer peripheral portions of the input-side and output-side disc shrouds 31, 33 so as to open in a tangential direction T of the input and output discs 15, 17.

In the present embodiment, the oil discharge ports 61 are provided in both the input-side disc shroud 31 and the output-side disc shroud 33, but the oil discharge ports 61 may be provided in only either one of them. In addition, in each of the disc shrouds 31, 33, the oil discharge ports 61 are provided at two locations spaced apart from each other by about 180° in the circumferential direction thereof, but the number and the positions of the oil discharge ports 61 in each of the disc shrouds 31, 33 are not limited to the illustrated example, and may be set as appropriate.

In the case where the oil discharge ports 61 are provided in the outer peripheral portions of the disc shrouds 31, 33 so as to open in the tangential direction T of the discs, it is possible to further efficiently discharge and collect the oil which is supplied to the discs in order to cool the discs.

In the description of each embodiment described above, the toroidal-type stepless transmission used in the IDG for an aircraft is shown as an example, but use of the toroidal-type stepless transmission to which the present invention is applied is not limited to use for an aircraft, and may be, for example, use for an automobile. In addition, the present invention is applicable not only to a double-cavity-type stepless transmission but also to a single-cavity-type toroidal-type stepless transmission in which only a single pair of an input disc and an output disc are provided.

Although the present invention has been described above in connection with the embodiments thereof with reference to the accompanying drawings, numerous additions, changes, or deletions can be made without departing from the gist of the present invention. Accordingly, such additions, changes, or deletions are to be construed as included in the scope of the present invention.

REFERENCE NUMERALS

1 . . . Toroidal-type stepless transmission
5 . . . Transmission output shaft
15 . . . Input disc
17 . . . Output disc
19 . . . Power roller
31 . . . Input-side disc shroud
33 . . . . Output-side disc shroud
33a . . . Inner wall of output-side disc shroud
33b . . . Outer peripheral wall of output-side disc shroud
33c . . . Outer wall of output-side disc shroud
37, 39 . . . Oil discharge groove
61 . . . Oil discharge port

What is claimed is:

1. A toroidal stepless transmission comprising:
at least a pair of an input disc and an output disc;
a power roller tiltably provided between the pair of the input disc and the output disc, the power roller being configured to transmit a driving force from the input disc to the output disc; and
disc shrouds covering the input disc and the output disc, respectively, and each of the disc shrouds including an inner wall and an outer wall,
wherein at least one of the disc shrouds has an introduction port, provided in the inner wall of the disc shroud, to introduce an oil from the outside of the disc shroud into the disc shroud,
each of the disc shrouds has an outer peripheral portion formed with an oil discharge groove configured to discharge an oil within each disc shroud, supplied to each of inner surfaces of the input disc and the output disc against which the power roller is pressed, to the outside, the oil discharge groove penetrating from an inner surface of the disc shroud to an outer surface of the disc shroud and extending in a circumferential direction of the disc shroud,
the oil discharge groove is provided in an outer peripheral portion of the inner wall and/or the outer wall of each disc shroud, and an axial length of an outer peripheral wall of the disc shroud which covers an outer peripheral surface of the input disc or the output disc is set to be shorter than an axial length of the outer peripheral surface of the input disc or the output disc, and the oil discharge groove is formed as a gap defined between the inner wall and the outer peripheral wall and/or as a gap defined between the outer wall and the outer peripheral wall, and
each of the inner surfaces of the input disc and the output disc has a shape against which the power roller is pressed, and each of the input disc and output disc include an outer surface that faces an axially opposite direction of the inner surfaces of the input disc and the output disc, respectively, and
the inner wall of each of the disc shrouds covers the inner surfaces, respectively, the outer wall of each of the disc shrouds covers the outer surface of each of the input disc and output disc, respectively, and the outer peripheral wall of each of the disc shrouds covers the outer peripheral surface of each of the input disk and output disk, respectively.

2. The toroidal stepless transmission as claimed in claim 1, wherein the oil discharge groove is located at least at a circumferential position downstream of the introduction port in a rotation direction of the disc.

3. The toroidal stepless transmission as claimed in claim 1, further comprising a roller shroud that covers the power roller.

4. The toroidal stepless transmission as claimed in claim 3, wherein the roller shroud covers at least a portion of the power roller on a side of one of the input disc and the output disc that rotates at a higher speed.

5. The toroidal stepless transmission as claimed in claim 3, wherein the roller shroud covers a bearing space of the power roller.

6. The toroidal stepless transmission as claimed in claim 1, wherein
the shape of each of the inner surfaces of the input disc and the output disc against which the power roller is pressed is a concave shape, and
the outer surface of each of the input disc and output disc that faces the axially opposite direction of the inner surfaces of the input disc and the output disc, respectively, is flat.

7. A toroidal stepless transmission comprising:
at least a pair of an input disc and an output disc;
a power roller tiltably provided between the pair of the input disc and the output disc, the power roller being configured to transmit a driving force from the input disc to the output; and
disc shrouds covering the input disc and the output disc, respectively,
wherein at least one of the disc shrouds has an introduction port, provided in an inner wall of the disc shroud, to introduce an oil from the outside of the disc shroud into the disc shroud,
each of the disc shrouds has an outer peripheral portion formed with an oil discharge groove configured to discharge an oil within each disc shroud, supplied to each of inner surfaces of the input disc and the output disc against which the power roller is pressed, to the outside, the oil discharge groove penetrating from an inner surface of the disc shroud to an outer surface of the disc shroud and extending in a circumferential direction of the disc shroud,
the oil discharge groove is provided in an outer peripheral portion of an inner wall and/or an outer wall of each disc shroud, and an axial length of an outer peripheral wall of the disc shroud which covers an outer peripheral surface of the input disc or the output disc is set to be shorter than an axial length of the outer peripheral surface of the input disc or the output disc, and the oil discharge groove is formed as a gap defined between the inner wall and the outer peripheral wall and/or as a gap defined between the outer wall and the outer peripheral wall, and the oil discharge groove is provided in a circumferential portion corresponding to ⅛ or more of an entire circumference of the outer peripheral portion of each disc shroud.

8. The toroidal type stepless transmission as claimed in claim 7, wherein the oil discharge groove is provided over the entire circumference of the outer peripheral portion of each disc shroud.

9. A toroidal stepless transmission comprising:

at least a pair of an input disc and an output disc;

a power roller tiltably provided between the pair of the input disc and the output disc, the power roller being configured to transmit a driving force from the input disc to the output disc; and disc shrouds covering the input disc and the output disc, respectively, wherein at least one of the disc shrouds has an introduction port, provided in an inner wall of the disc shroud, to introduce an oil from the outside of the disc shroud into the disc shroud, each of the disc shrouds has an outer peripheral portion formed with an oil discharge groove configured to discharge an oil within each disc shroud to the outside, the oil discharge groove penetrating from an inner surface of the disc shroud to an outer surface of the disc shroud and extending in a circumferential direction of the disc shroud, and an oil discharge port is provided in the outer peripheral portion of each disc shroud so as to open in a tangential direction of the disc.

* * * * *